(12) United States Patent
Tsukada et al.

(10) Patent No.: US 7,900,761 B2
(45) Date of Patent: Mar. 8, 2011

(54) CLUTCH SYSTEM

(75) Inventors: Yoshiaki Tsukada, Saitama (JP);
Masahiro Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 809 days.

(21) Appl. No.: 11/892,643

(22) Filed: Aug. 24, 2007

(65) Prior Publication Data
US 2008/0053775 A1 Mar. 6, 2008

(30) Foreign Application Priority Data

Aug. 30, 2006 (JP) ................................ 2006-233988

(51) Int. Cl.
*F16D 25/10* (2006.01)
(52) U.S. Cl. .................................. 192/48.619; 192/48.8
(58) Field of Classification Search ............. 192/48.618, 192/48.619
See application file for complete search history.

(56) References Cited

U.S. PATENT DOCUMENTS

| 3,746,138 A | * | 7/1973 | Forster et al. | 192/48.619 |
|---|---|---|---|---|
| RE27,937 E | * | 3/1974 | Hensel | 192/48.61 |
| 4,741,422 A | * | 5/1988 | Fuehrer et al. | 192/48.617 |
| 2007/0144858 A1 | * | 6/2007 | Ieda et al. | 192/48.8 |

FOREIGN PATENT DOCUMENTS

| JP | 2005-133937 A | | 5/2005 |
|---|---|---|---|
| JP | 2007-24079 A | * | 2/2007 |

* cited by examiner

*Primary Examiner* — Richard M. Lorence
(74) *Attorney, Agent, or Firm* — Birch, Stewart, Kolasch & Birch, LLP

(57) ABSTRACT

To provide a smaller clutch system with fewer component parts, the clutch system includes a first hydraulic clutch, which is provided between a power source and a first driven shaft, and a second hydraulic clutch, which is provided between the power source and a second driven shaft. An input member includes an annular plate portion, an inner cylindrical portion, and an outer cylindrical portion. The input member is provided commonly to a first and a second hydraulic clutches, while the inner and the outer cylindrical portions are made to be the input sides respectively of the first and the second hydraulic clutches. First and a second clutch pistons, which are included respectively in the first and the second hydraulic clutches, are placed on an opening end side of the input member.

20 Claims, 10 Drawing Sheets

UP-SHIFTING WHILE RUNNING IN SECOND SPEED ic # CLUTCH SYSTEM

CROSS-REFERENCE TO RELATED APPLICATIONS

This nonprovisional application claims priority under 35 U.S.C. §119(a) on Patent Application No. 2006-233988, filed in Japan on Aug. 30, 2006, the entirety of which is incorporated herein by reference.

BACKGROUND OF THE INVENTION

1. Field of the Invention

The present invention relates to a clutch system that includes a first hydraulic clutch between a power source and a first driven shaft and is capable of switching connection and disconnection therebetween. A second hydraulic clutch is provided between the power source and a second driven shaft and is capable of switching the connection and the disconnection therebetween.

2. Background of the Invention

Japanese Patent Application Laid-Open Publication No. 2005-133937 discloses an example of clutch systems of the type described above. In the clutch system disclosed in Japanese Patent Application Laid-Open Publication No. 2005-133937; however, each of the pair of hydraulic clutches includes individually an input member. This makes the clutch system larger than otherwise, while the number of component parts for the clutch system is increased.

SUMMARY OF THE INVENTION

The present invention is made in view of the above-described problems. An object of the present invention is, therefore, to provide a clutch system that is made smaller and needs less component parts.

To accomplish the above-described object, a first aspect of the present invention provides a clutch system which includes a first hydraulic clutch provided between a power source and a first driven shaft and being capable of switching connection and disconnection therebetween, and which also includes a second hydraulic clutch provided between the power source and a second driven shaft and being capable of switching the connection and the disconnection. In the clutch system, an input member is provided commonly to the first and the second hydraulic clutches. The input member includes an annular plate portion, which receives the power from the power source, an inner cylindrical portion, which has the base end formed integrally with and continuously from the inner perimeter side of the annular plate portion, and an outer cylindrical portion, which coaxially surrounds the inner cylindrical portion, and which has the base end formed integrally with and continuously from the outer perimeter side of the annular plate. The inner and the outer cylindrical portions are made to be the input sides respectively of the first and the second hydraulic clutches, which are arranged so that the first hydraulic clutch is concentrically surrounded by the second hydraulic clutch. A first and a second clutch pistons, which are included respectively in the first and the second hydraulic clutches, are placed on the opening end side of the input member.

A second aspect of the invention provides the structure as described in the first aspect with the following additional features. The first hydraulic clutch includes a first output member, which has a first cylindrical portion coaxially surrounding the inner cylindrical portion. The first output member is linked with the first driven shaft so as not to be allowed to rotate relatively thereto. Meanwhile, the second hydraulic clutch includes a second output member, which has a second cylindrical portion coaxially surrounding the first cylindrical portion inside the outer cylindrical portion. The second output member is linked with the second driven shaft so as not to be allowed to rotate relatively thereto.

A third aspect of the invention provides the structure as described in any one of the first and the second aspects with the following additional features. The second driven shaft penetrates, and is placed coaxially with, the first driven shaft, and is capable of rotating relatively to the first driven shaft. The first and the second clutch pistons are arranged side by side in the axial direction while the second clutch piston has a larger diameter than the first clutch piston has. Inside the second driven shaft, a hydraulic passage is formed to supply an operating fluid to the side of the first and the second pistons.

A fourth aspect of the invention provides the structure as described in the third aspect further including an operating-fluid supply chamber for supplying the operating fluid. The operating-fluid supply chamber is connected to the hydraulic passage in an opposite end portion of the second driven shaft from the clutch system.

A fifth aspect of the invention provides the structure as described any one of the first to the fourth aspects, further including a buffering member is set between the annular plate portion of the input member and a rotating transmission member that connects to the power source.

Note that a damper spring 12, a first main shaft 15, a second main shaft 16, a driven gear 31, and an engine E in the embodiment correspond respectively to the buffering member, the first driven shaft, the second driven shaft, the rotating transmission member, and the power source of the invention.

In the first aspect of the invention, the common input member shared by the first and the second hydraulic clutches helps decrease the number of component parts and makes the clutch system smaller as a whole. In addition, when the connection and the disconnection of the two hydraulic clutches are switched, the output members of the respective hydraulic clutches engage with the common input member. This results in a smaller change in the inertial force at the time of switching the connection and the disconnection, and thus a smooth switching between the connection and the disconnection is accomplished.

According to the second aspect of the invention, the first and the second cylindrical portions, which are respectively parts of the output members of the two hydraulic clutches, are placed closely to each other. Thus, the inertial mass on the output side of the first hydraulic clutch and that of the second hydraulic clutch get closer to each other. As a result, no big change in feelings occurs when the clutches engage and disengage.

According to the third aspect of the invention, a simplified structure of the operating-fluid supplying route to the two hydraulic clutches is accomplished.

According to the fourth aspect of the invention, no mechanism for switching the engagement and disengagement of the two hydraulic clutches is placed outside of the clutch system so that no space for placing such a mechanism needs to be secured outside of the clutch system.

According to the fifth aspect of the invention, the common buffering member absorbs the fluctuation of the power transmitted from the power source to the two hydraulic clutches.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
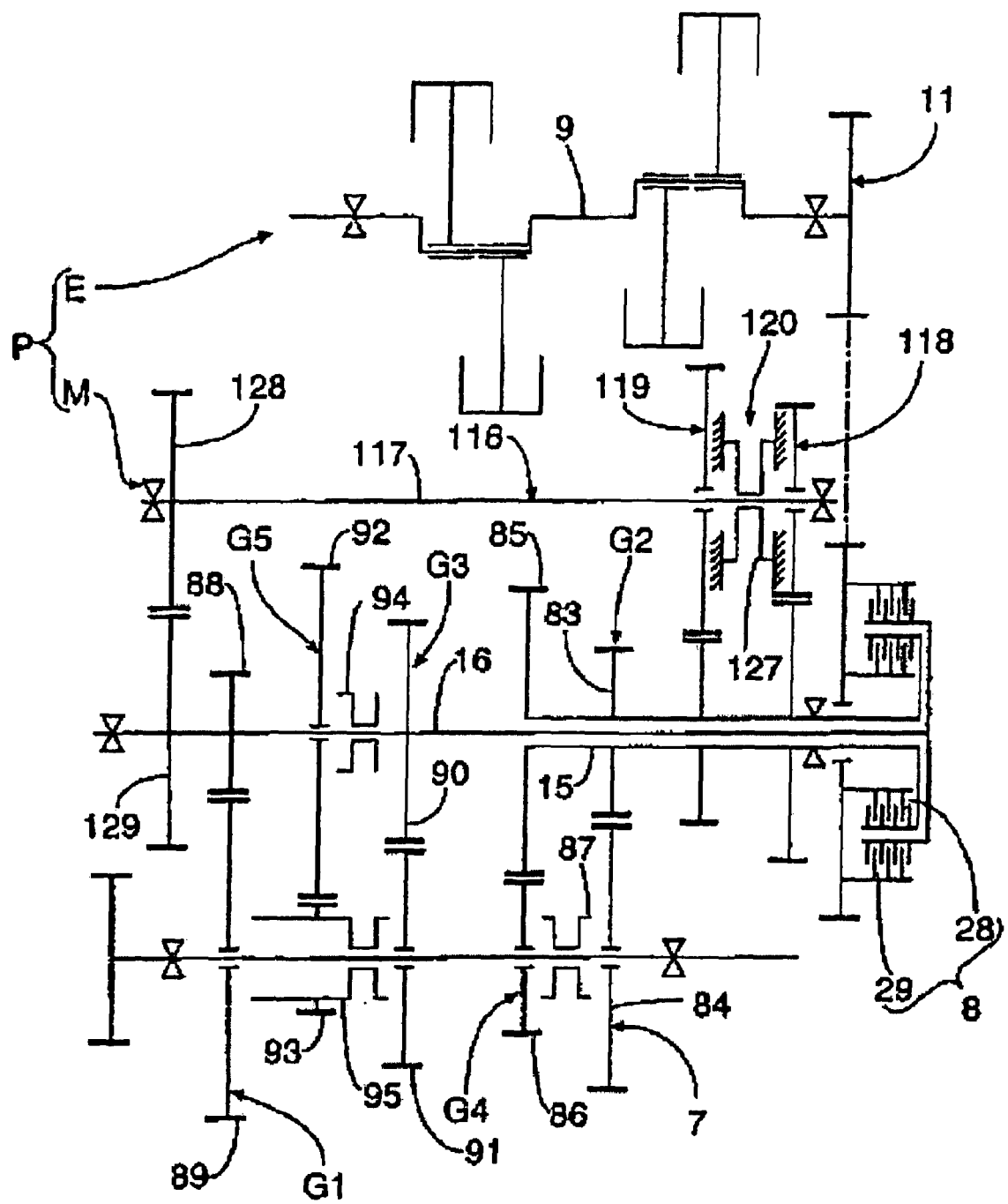
FIG. 1 is a simplified diagram showing a basic configuration of a power unit.

The present invention will now be described in detail with reference to the accompanying drawings, wherein the same reference numerals will be used to identify the same or similar elements throughout the several views.

Figure 2:
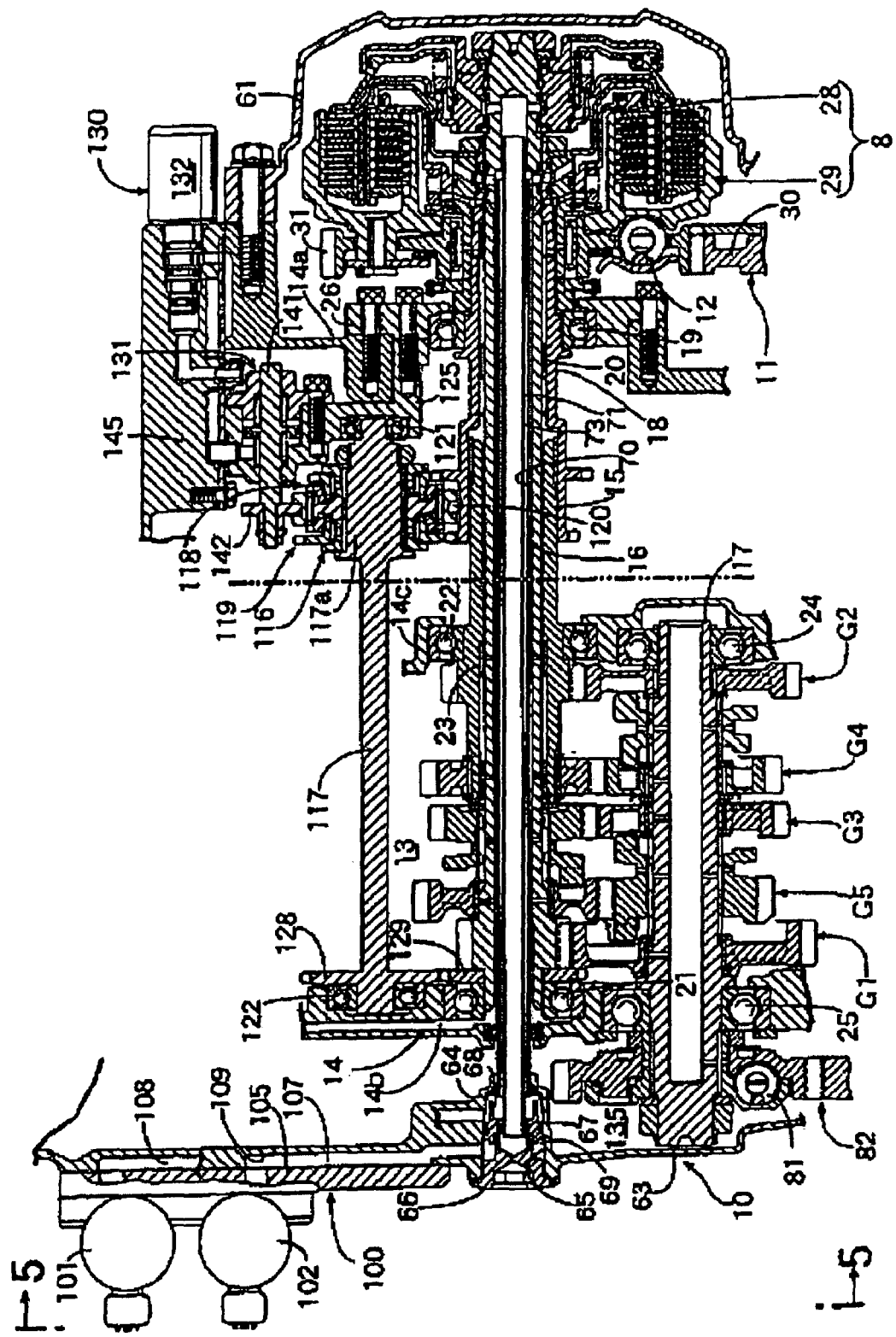
FIG. 2 is a vertical cross-sectional view showing a part of a transmission system.
Figure 3:
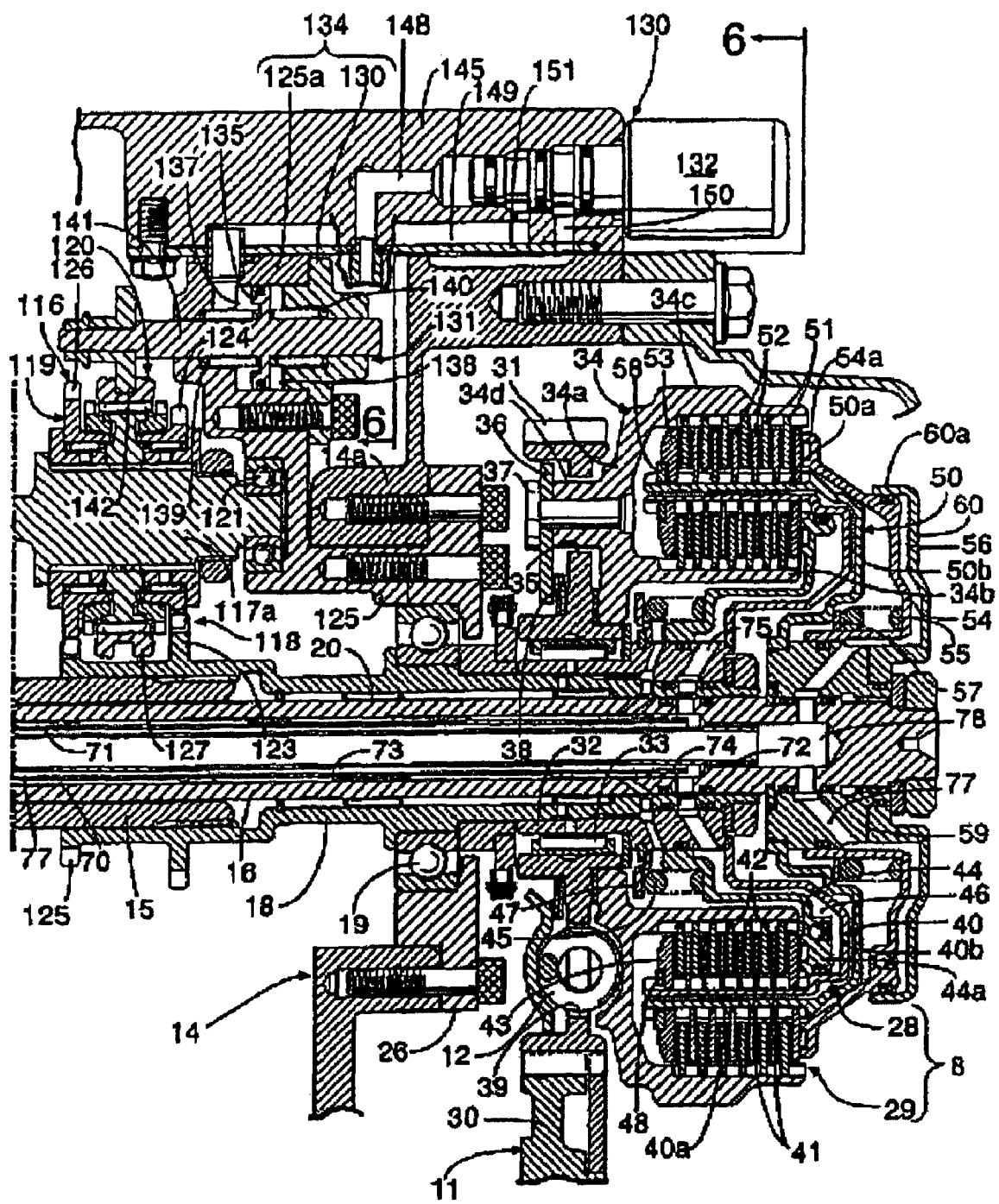
FIG. 3 is an enlarged view of the right half of FIG. 2.
Figure 4:
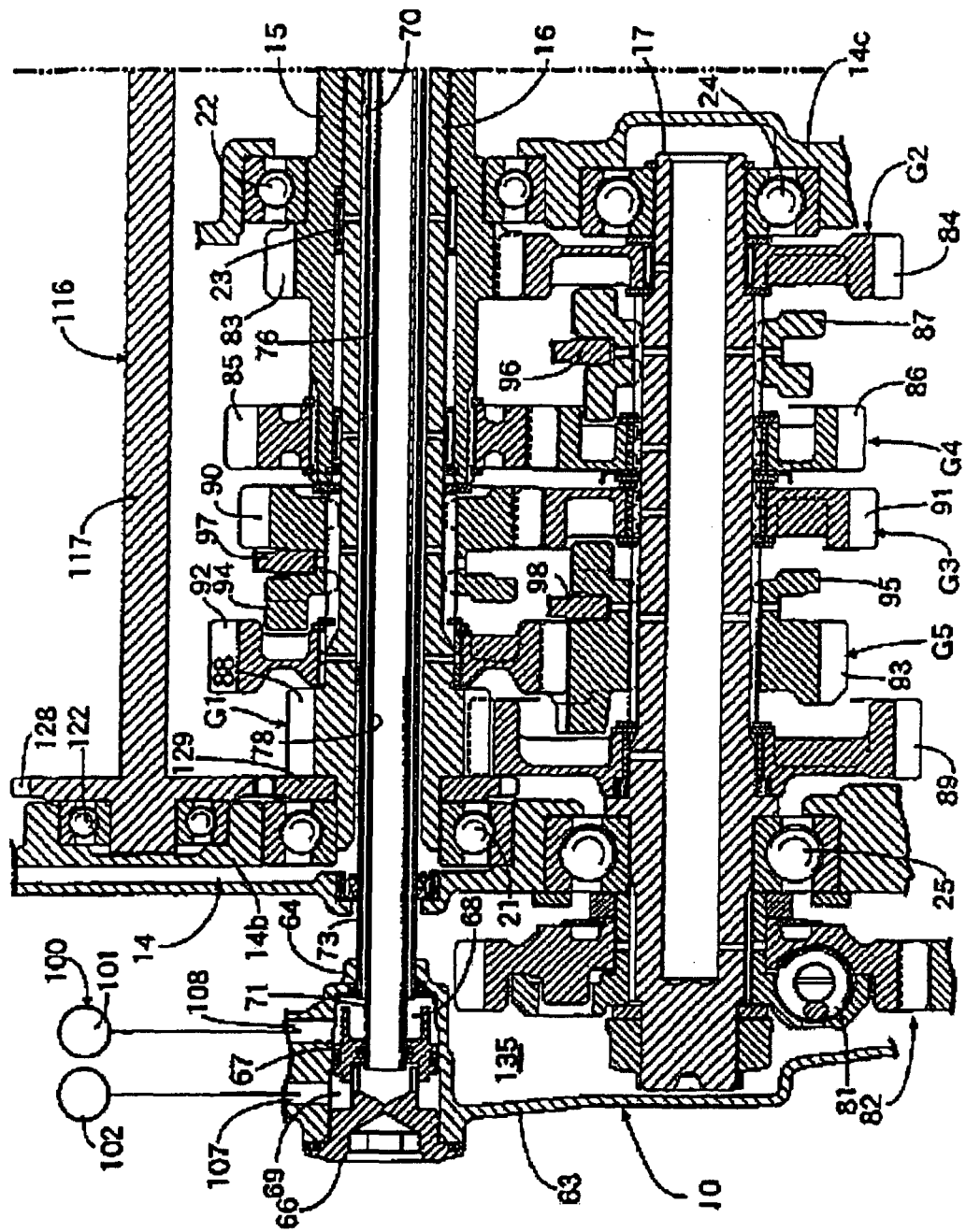
FIG. 4 is an enlarged view of the left half of FIG. 2.
Figure 5:
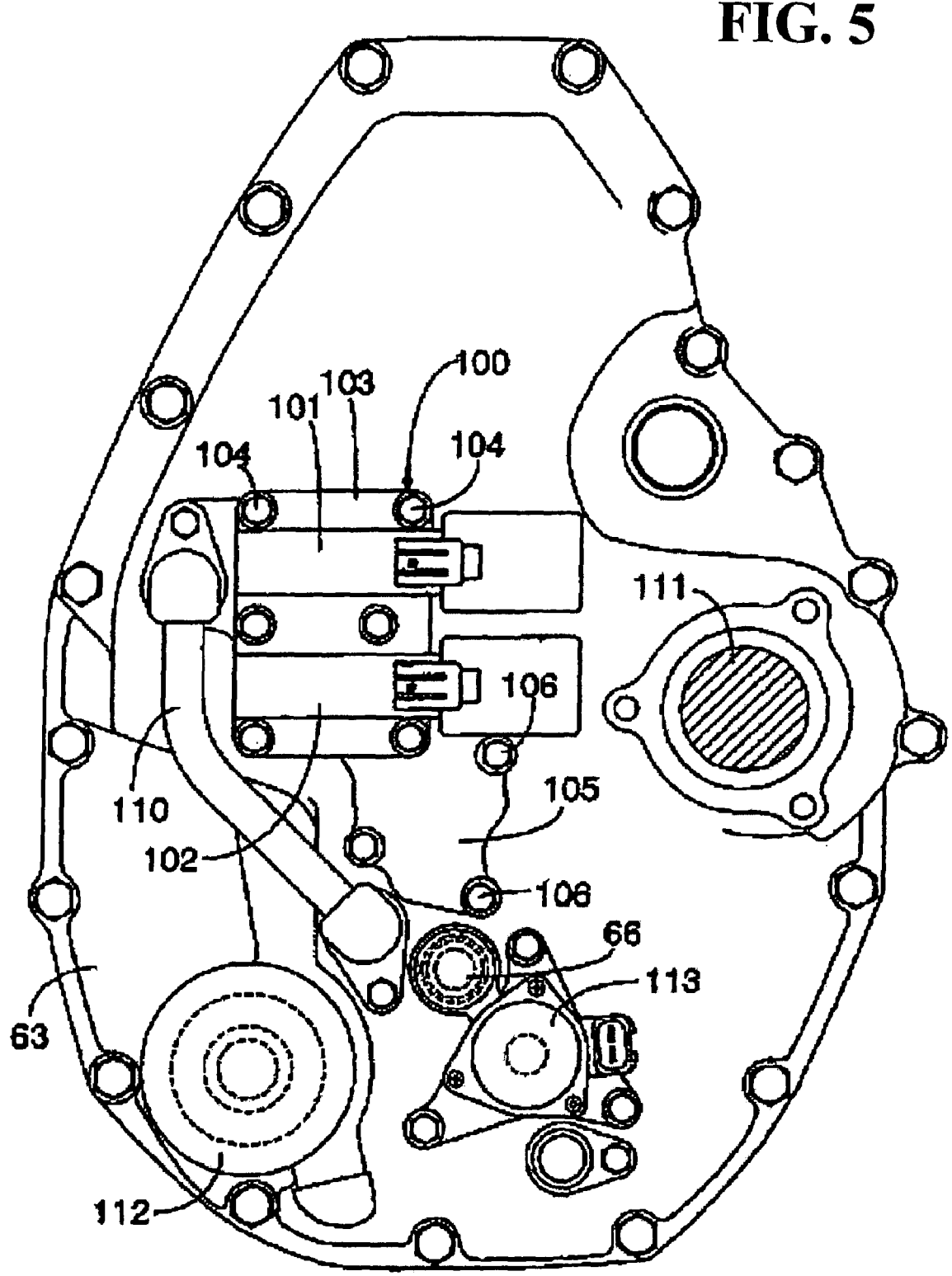
FIG. 5 is a view on the arrow 5-5 of FIG. 2.
Figure 6:
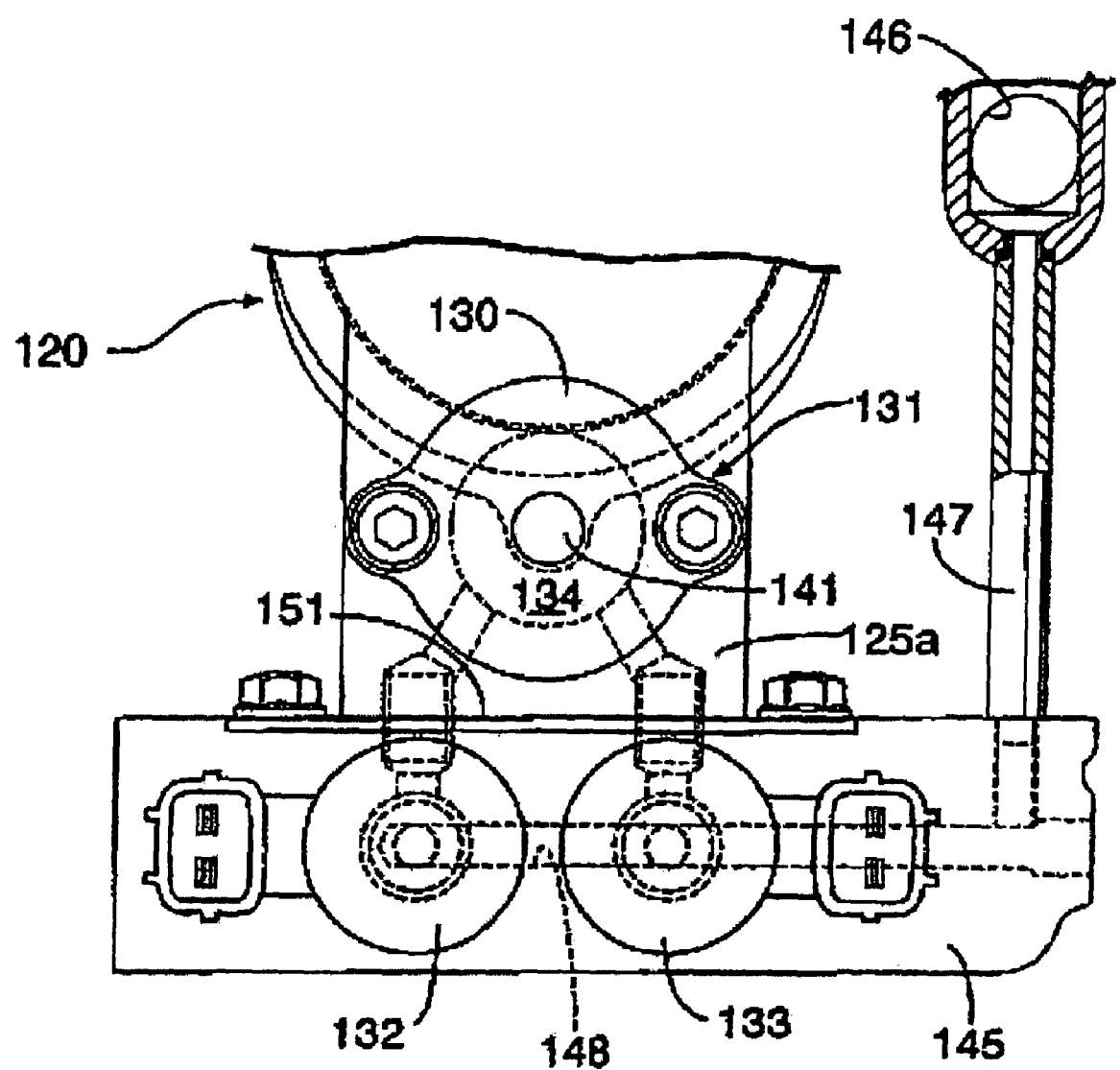
FIG. 6 is a cross-sectional view taken along the line 6-6 of FIG. 3.
Figure 7:
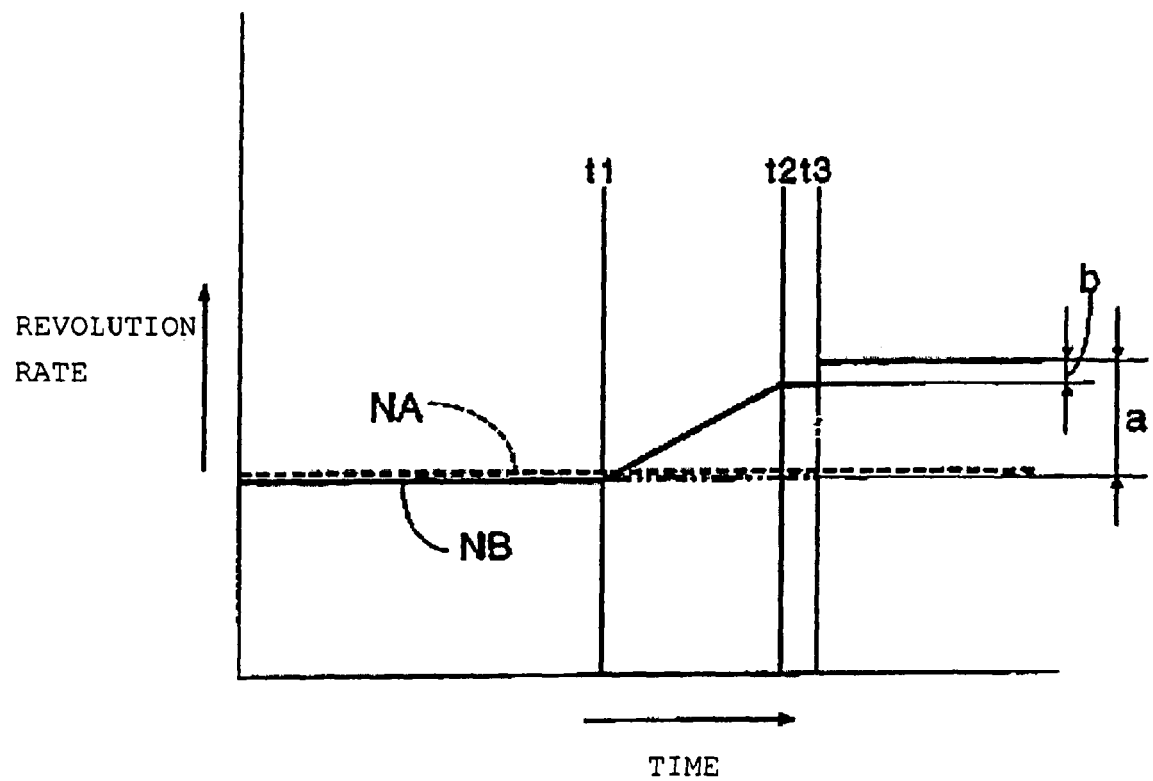
FIG. 7 is a chart showing the change in revolution rate of a first and a second main shafts at the time of down-shifting while the vehicle runs in second speed.
Figure 8:
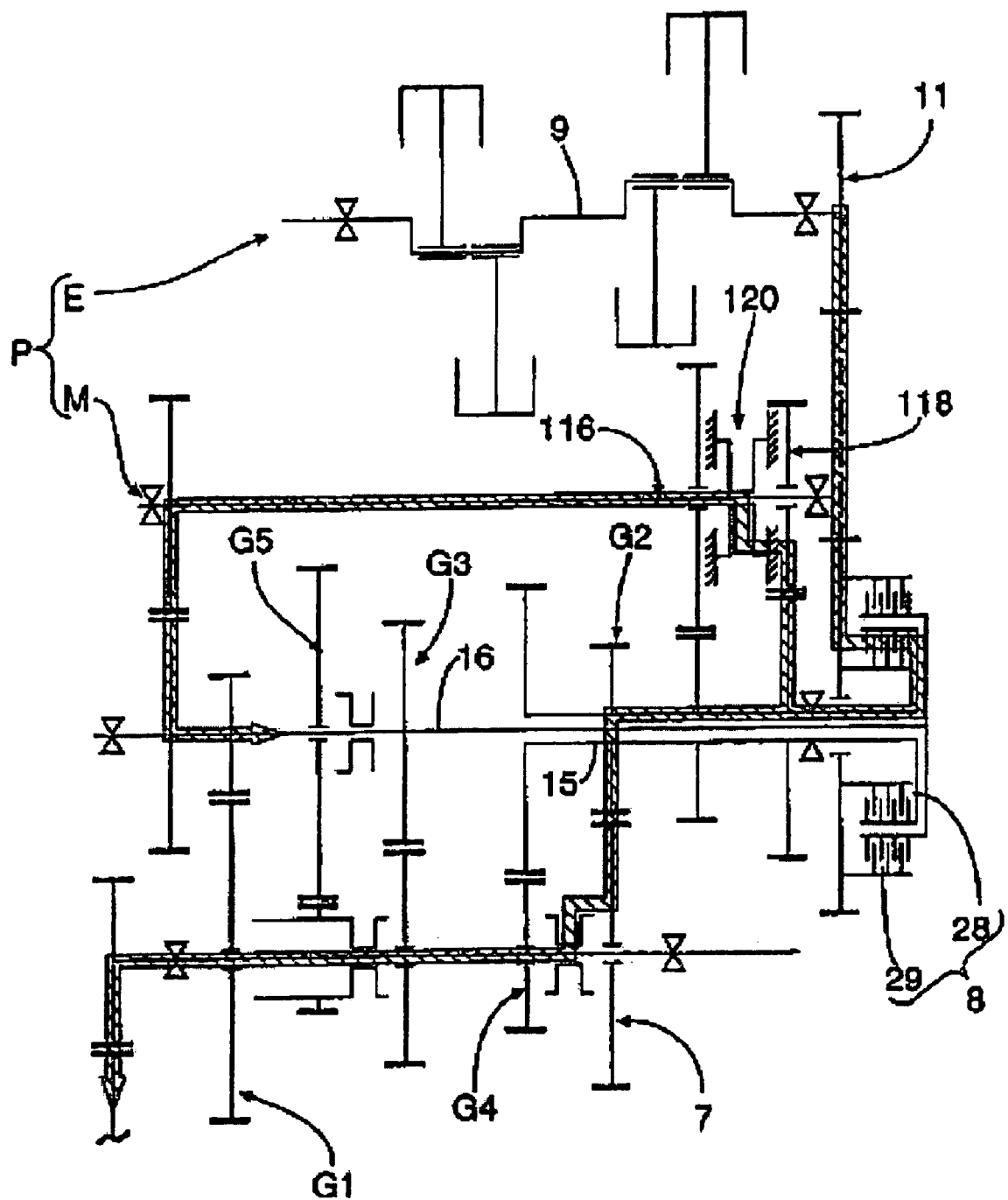
FIG. 8 is a diagram showing a route that the power is transmitted when a synchronizing means operates at the time of down-shifting while the vehicle runs in second speed.
Figure 9:
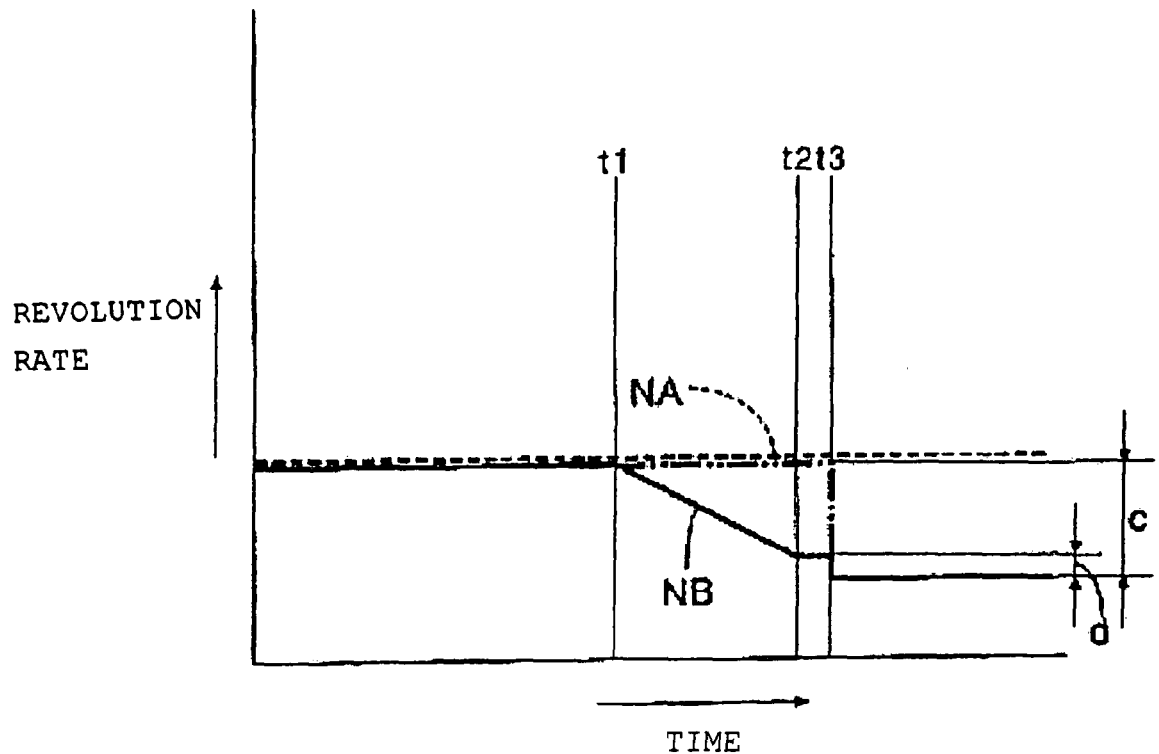
FIG. 9 is a chart showing the change in revolution rate of the first and the second main shafts at the time of up-shifting while the vehicle runs in second speed.
Figure 10:
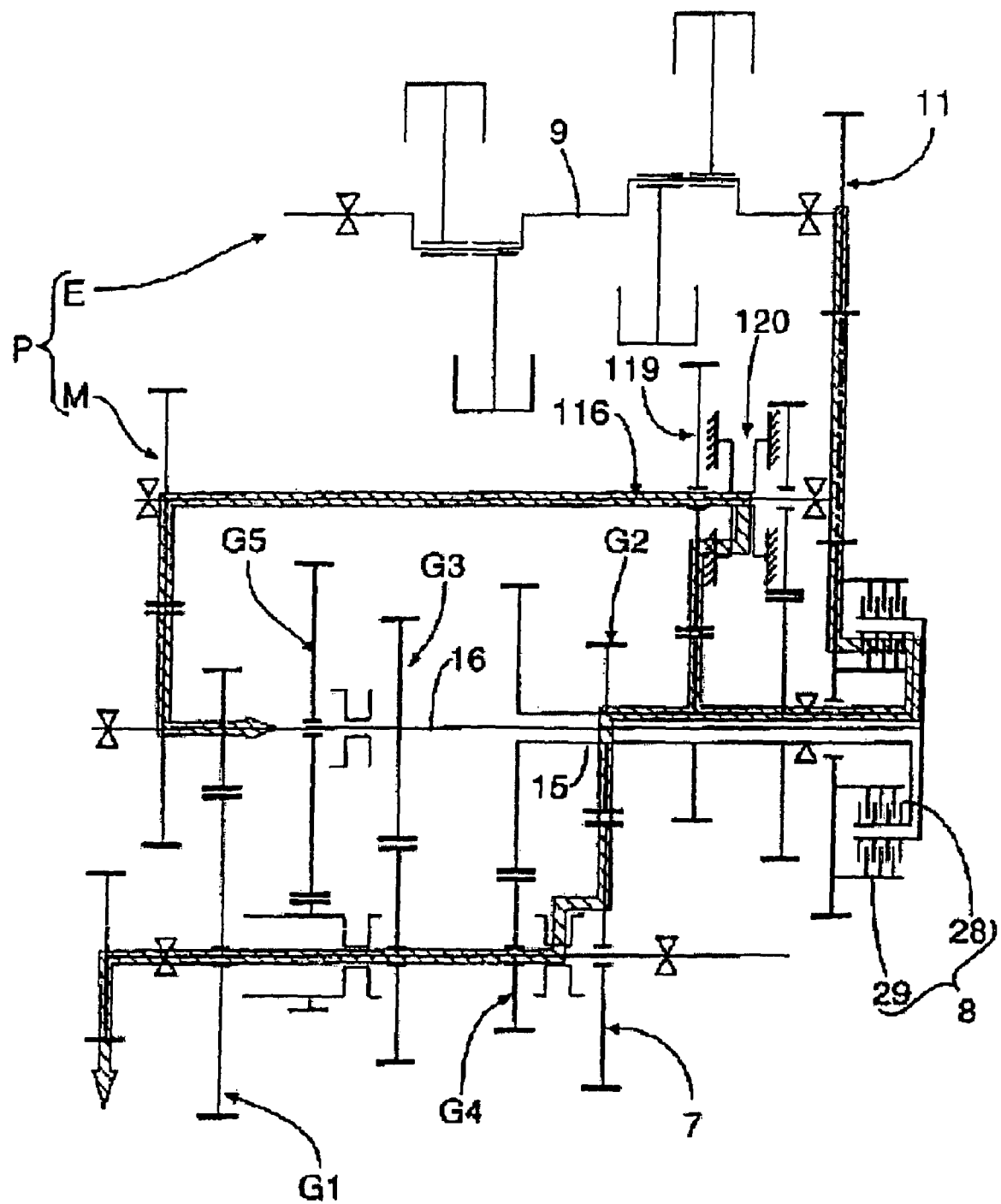
FIG. 10 is a diagram showing a route that the power is transmitted when the synchronizing means operates at the time of up-shifting while the vehicle runs in second speed.

FIGS. 1 to 10 show an embodiment of the present invention. FIG. 1 is a simplified diagram showing the basic configuration of a power unit. FIG. 2 is a vertical cross-sectional view showing a part of a transmission. FIG. 3 is an enlarged view of the right-hand half of FIG. 2. FIG. 4 is an enlarged view of the left-hand half of FIG. 2. FIG. 5 is a view in the direction of the arrow 5-5 in FIG. 2. FIG. 6 is a cross-sectional view taken along the line 6-6 in FIG. 3. FIG. 7 is a graph showing the change in the revolution speeds of first and second main shafts, which change takes place at the time of down-shifting while the vehicle runs in second gear. FIG. 8 is a diagram showing a power-transmission route at the time when a synchronizing means operates at the down-shifting while the vehicle runs in second gear. FIG. 9 is a graph showing the change in the revolution speeds of first and second main shafts, which change takes place at the time of up-shifting while the vehicle runs in second gear. FIG. 10 is a diagram showing a power-transmission route at the time when a synchronizing means operates at the up-shifting while the vehicle runs in second gear.

FIG. 1 shows a power unit P to be mounted, for example, on a motorcycle, and includes an engine E and a transmission system M. The engine E is, for example, a four-cylinder engine, while the transmission system M changes the speed of the output of the engine E and transmits the output to the rear wheel, which is not illustrated here. The transmission system M includes a gear transmission 7, which has a plurality of gear trains, such as a first- to a fifth-speed gear trains G1 to G5, and with which a speed can be selected to be established from a plurality of speeds, and also includes a clutch system 8 provided between the engine E and the gear transmission 7.

Now, refer also to FIG. 2. The torque of a crankshaft 9 that the engine E has (see FIG. 1) is received by the clutch system 8 via a primary reduction system 11 and a damper spring 12. The clutch system 8 switches from allowing to blocking, or vice versa, the transmission of the torque from the crankshaft 9, via the primary reduction system 11 and the damper spring 12, to the gear transmission 7.

A crankcase 14 is provided to an engine body 10. In the crankcase 14, a right-hand sidewall 14a and a left-hand sidewall 14b are located respectively on the right and the left sides with respect to the direction in which the motorcycle advances. Meanwhile a middle wall 14c is located in a middle portion between the right-hand and the left-hand sidewalls 14a and 14b. In the crankcase 14, a transmission housing 13 is formed between the left-hand sidewall 14b and the middle wall 14c to accommodate the gear transmission 7.

The gear transmission 7 has a first main shaft 15, a second main shaft 16, and a countershaft 17, all of which are rotatably supported by the crankcase 14. The cylindrical first main shaft 15 has an axis parallel to the crankshaft 9. The second main shaft 16 coaxially penetrates the first main shaft 15. The second main shaft 16 can rotate relatively to the first main shaft 15 while the relative positions of the two shafts 15 and 16 are fixed in the axial direction.

The second main shaft 16 penetrates the right-hand sidewall 14a, the middle wall 14c, and the left-hand sidewall 14b with a first end portion of the second main shaft 16 sticking out from the right-hand sidewall 14a of the crankcase 14 and a second end portion sticking out from the left-hand sidewall 14b. Thus, the second main shaft rotates freely. A transmission cylinder shaft 18, which is coaxially joined with the first main shaft 15 while being not allowed to rotate relatively to the first main shaft 15, coaxially surrounds the second main shaft 16. The transmission cylinder shaft 18 penetrates a support ring 26 fastened to the right-hand sidewall 14a of the crankcase 14, and rotates freely. A ball bearing 19 is set between the transmission cylinder shaft 18 and the support ring 26. In addition, needle bearings 20 are set between the transmission cylinder shaft 18 and the second main shaft 16 while a ball bearing 21 is set between the left-hand sidewall 14b and the second main shaft 16. The first main shaft 15 penetrates the middle wall 14c of the crankcase 14, and rotates freely. A ball bearing 22 is set between the middle wall 14c and the first main shaft 15 while needle bearings 23 are set between the first and the second main shafts 15 and 16.

A first end portion of the countershaft 17 is rotatably supported by the middle wall 14c of the crankcase 14 with a ball bearing 24 interposed in between. Meanwhile, a second end portion of the countershaft 17 penetrates the left-hand sidewall 14b of the crankcase 14, and rotates freely. A ball bearing 25 is set between the left-hand sidewall 14b and the countershaft 17.

Now, refer also to FIG. 3. The clutch system 8 includes a first and a second hydraulic clutches 28 and 29 of the multi-plate type. The first hydraulic clutch 28 switches from allowing to blocking, or vice versa, the transmission of the driving power from the primary reduction system 11 to the first main shaft 15. Meanwhile the second hydraulic clutch 29 switches from allowing to blocking, or vice versa, the transmission of the driving power from the primary reduction system 11 to the second main shaft 16.

The primary reduction system 11 is composed of a drive gear 30 on the crankshaft 9 and a driven gear 31 meshing with the drive gear 30. A cylindrical first boss 32 coaxially surrounds and is joined to the first main shaft 15 while not allowed to rotate relatively to the first main shaft 15. The driven gear 31 is supported by the first boss 32 with a roller bearing 33 interposed in between, and thus rotates freely.

An input member 34 is provided to and shared by the first and the second clutches 28 and 29. The input member 34 includes an annular plate portion 34a, an inner cylindrical portion 34b, and an outer cylindrical portion 34c. The annular plate portion 34a is located adjacently to the primary reduction system 11 at its outer side in the axial direction of the second main shaft 16. On the inner perimeter side of the annular plate portion 34a and at the side opposite the side where the primary reduction system 11 is located, the inner cylindrical portion 34b is, integrally and continuously, formed with the base end of the inner cylindrical portion 34b being perpendicular to the annular plate portion 34a. The outer cylindrical portion 34c is, integrally and continuously, formed on the outer perimeter side of the annular plate portion 34a with the base end of the outer cylindrical portion 34c being perpendicular to the annular plate portion 34a. The outer cylindrical portion 34c, thus formed, coaxially surrounds the inner cylindrical portion 34b. In the annular plate portion 34a of the input member 34, joint bosses 34d are integrally formed extending from a plurality of positions along the circumferential direction. The joint bosses 34d are located at the opposite side of the annular plate portion 34a from the inner cylindrical portion 34b and the outer cylindrical portion 34c. Long holes 35, each of which has a shape elongated in the circumferential direction, are formed in the driven gear 31. The joint bosses 34d are respectively inserted into the long holes 35. A retention plate 36, which faces the driven gear 31 at the opposite side thereof from the input member 34, abuts on the joint bosses 34d. The retention plate 36 is joined to the end faces of the joint bosses 34d with respective rivets 37, each of which penetrates the corresponding one of the joint bosses 34d. In addition, a disc spring 38 is provided between the retention plate 36 and the driven gear 31 for generating a spring force to make the driven gear 31 abut on the annular plate portion 34a of the input member 34.

In the driven gear 31, retention holes 39, each of which has a shape elongated in the circumferential direction, are formed in a plurality of positions, which are shifted, in the circumferential direction, from the positions of the long holes 35. The damper spring 12 is accommodated and held in each of the retention holes 39 so as to be enclosed by the driven gear 31, the input member 34, and the retention plate 36.

The first hydraulic clutch 28 includes the above-described inner cylindrical portion 34b of the input member 34, a first output member 40, a plurality of first clutch discs 41, a plurality of first clutch plates 42, a first pressure-receiving plate 43, a first clutch piston 44, and a first clutch spring 45. The first output member 40 has a first cylindrical portion 40a, which coaxially surrounds the inner cylindrical portion 34b. The first output member 40 is fixed to the first boss 32, and is thus joined to the first main shaft 15 as being not allowed to rotate relatively to the first main shaft 15. The first clutch discs 41 engage with the first cylindrical portion 40a as being not allowed to rotate relatively to the first cylindrical portion 40a. The first clutch plates 42 engage with the inner cylindrical portion 34b as being not allowed to rotate relatively to the inner cylindrical portion 34b, and are arranged as being alternately stacked with the first clutch discs 41. The first pressure-receiving plate 43 faces the first clutch discs 41 and the first clutch plates 42, which are arranged as being alternately stacked with each other, from the side where the annular plate portion 34a is located. The first clutch piston 44 has an annular first pressure plate portion 44a, and is located on the opening end side of the input member 34. The first pressure plate portion 44a faces the first clutch discs 41 and the first clutch plates 42, which are arranged as being alternately stacked with each other, from the side opposite the side where the annular plate portion 34a is located. The first clutch spring 45 generates a spring force that biases the first pressure plate portion 44a so as to move away from the first pressure-receiving plate 43.

The first clutch piston 44 has the annular first pressure plate portion 44a at the outer circumference thereof while the inner circumferential portion of the first clutch piston 44 is, slidingly and liquid-tightly, in contact with the outer circumference of the first boss 32. The first output member 40 has a joint plate portion 40b, which is a dish-like portion facing the first clutch piston 44 from the outer side. While the inner circumferential portion of the joint plate portion 40b is welded to the first boss 32, an end of the first cylindrical portion 40a is linked to and integrated with the outer circumference of the joint plate portion 40b. The outer circumference of the first pressure plate portion 44a of the first clutch piston 44 is, slidably and liquid-tightly, fitted into the inner surface of the outer circumference portion of the joint plate portion 40b. A first hydraulic chamber 46 is thus formed between the first clutch piston 44 and the first output member 40. The first clutch spring 45 is provided between the first clutch piston 44 and a first retainer 47, which is fitted onto the outer circumference of the first boss 32. The first clutch spring 45 thus provided biases the first clutch piston 44 so as to reduce the volume of the first hydraulic chamber 46. In addition, a stopper ring 48 is fitted to the inner surface of the first cylindrical portion 40a near the open end thereof, and abuts on the outer periphery of the first pressure-receiving plate 43 from the opposite side of the plate 43 from the first pressure plate portion 44a.

In the first hydraulic clutch 28 with this structure, as the oil pressure in the first hydraulic chamber 46 increases, the first clutch discs 41 and the first clutch plates 42, which are alternately stacked, are pressed by and between the first pressure plate portion 44a and the first pressure-receiving plate 43, and thus frictionally engage with each other. Accordingly, the driving power is transmitted from the inner cylindrical portion 34b of the input member 34 to the first output member 40 while the driving power of the crankshaft 9 is transmitted from the first boss 32, via the transmission cylinder shaft 18, to the first main shaft 15.

The second hydraulic clutch 29 includes the outer cylindrical portion 34c of the input member 34, a second output member 50, a plurality of second clutch discs 51, a plurality of second clutch plates 52, an annular second pressure-receiving plate 53, a second clutch piston 54, and a second clutch spring 55. The second output member 50 has a second cylindrical portion 50a, which is provided inside the outer cylindrical portion 34c, and which coaxially surrounds the first cylindrical portion 40a of the first hydraulic clutch 28, and is thus joined to the second main shaft 16 as being not allowed to rotate relatively to the second main shaft 16. The second clutch discs 51 engage with the outer cylindrical portion 34c as being not allowed to rotate relatively to the outer cylindrical portion 34c. The second clutch plates 52 engage with the second cylindrical portion 50a as being not allowed to rotate relatively to the second cylindrical portion 50a, and are arranged as being alternately stacked with the second clutch discs 51. The second pressure-receiving plate 53 faces the second clutch discs 51 and the second clutch plates 52, which are arranged as being alternately stacked with each other, from the side where the annular plate portion 34a is located. The second clutch piston 54 has an annular second pressure plate portion 54a, which faces the second clutch discs 51 and the second clutch plates 52, which are arranged as being alternately stacked with each other, from the side opposite the side where the annular plate portion 34a is located. The second clutch spring 55 generates a spring force that biases the second pressure plate portion 54a so as to move away from the second pressure-receiving plate 53.

A cylindrical second boss 59, which coaxially surrounds the second main shaft 16, is joined to an end portion of the second main shaft 16 as not being allowed to rotate relatively to the second main shaft 16. The second output member 50 has a joint plate portion 50b, which is a dish-like portion facing the joint plate portion 40b of the first output member 40 in the first hydraulic clutch 28 from the outer side. While the inner circumferential portion of the joint plate portion 50b is welded to the second boss 59, an end of the second cylindrical portion 50a is linked to and integrated with the outer circumference of the joint plate portion 50b. The second clutch piston 54 has the annular second pressure plate portion 54a formed on the outer circumference thereof, and faces the joint plate portion 50b of the second output member 50 from outside. The inner circumferential portion of the second clutch piston 54 is, slidingly and liquid-tightly, in contact with the outer circumference of the second boss 59. The first clutch piston 44 of the first clutch 28 and the second clutch piston 54, which has a larger diameter than the first clutch piston 44, are arranged side by side in the axial direction.

In addition, the outer circumference of the second pressure plate portion 54a of the second clutch piston 54 is, slidably and liquid-tightly, fitted into a third cylindrical portion 60a, formed on the outer perimeter of a dish-shaped case member 60. The inner circumference of the case member 60 is liquid-tightly fixed to the second boss 59, and thus a second hydraulic chamber 56 is formed between the second clutch piston 54 and the case member 60. The second clutch spring 55 is provided between the second clutch piston 54 and a second retainer 57, which is fitted into the joint plate portion 50b of the second output member 50. The second clutch spring 55 thus provided biases the second clutch piston 54 so as to reduce the volume of the second hydraulic chamber 56. In addition, a stopper ring 58 is fitted onto the outer surface of the second cylindrical portion 50a near the open end thereof, and abuts on the outer periphery of the second pressure-receiving plate 53 from the opposite side of the plate 53 from the second pressure plate portion 54a.

In the second hydraulic clutch 29 with this structure, as the oil pressure in the second hydraulic chamber 56 increases, the second clutch discs 51 and the second clutch plates 52, which are alternately stacked, are pressed by and between the second pressure plate portion 54a and the second pressure-receiving plate 53, and thus frictionally engage with each other. Accordingly, the power is transmitted from the outer cylindrical portion 34c of the input member 34 to the second output member 50 while the power of the crankshaft 9 is transmitted from the second boss 59 to the second main shaft 16.

Incidentally, first ends of the first and the second main shafts 15 and 16 are connected respectively to the first and the second hydraulic clutches 28 and 29 of the clutch system 8 outside of the right-hand sidewall 14a of the crankcase 14. A clutch cover 61, which covers the clutch system 8, is fastened to the right-hand sidewall 14a.

As shown in FIG. 4, an engine cover 63 is provided to cover the left-hand sidewall 14b of the crankcase 14. In the engine cover 63, a passage hole 65 is coaxially formed with the first and the second main shafts 15 and 16. The passage hole 65 has an end-wall 64 at the inner end thereof while a cap 66 is provided to liquid-tightly close the outer end of the passage hole 65.

A wall member 67 is liquid-tightly fitted into the passage hole 65. A first operating-fluid supply chamber 68 is thus formed between the wall member 67 and the end wall 64 while a second operating-fluid supply chamber 69 is formed between the wall member 67 and the cap 66. In addition, a center hole 70 with a base, the center hole 70 having a first end closed and a second end open, is coaxially formed in the second main shaft 16. An inner supply pipe 71, which is coaxially inserted into the center hole 70, has a first end portion placed in the vicinity of the closed-end of the central hole 70. A second end portion of the inner supply pipe 71 penetrates the end wall 64, and is liquid-tightly held by the wall member 67. An annular seal member 72 (see FIG. 3) is set between the first end portion of the inner supply pipe 71 and the inner circumferential surface of the center hole 70. Furthermore, an outer supply pipe 73 is inserted into the central hole 70 while coaxially surrounding the inner supply pipe 71, and extends until reaching the vicinity of the first end portion of the inner supply pipe 71. An annular seal member 74 (see FIG. 3) is set between a first end portion of the outer supply pipe 73 and the inner circumferential surface of the center hole 70. Meanwhile, a second end portion of the outer supply pipe 73 liquid-tightly penetrates the left-hand sidewall 14b of the crankcase 14, and then is liquid-tightly fitted into and held by the end wall 64 of the passage hole 65.

Now, attention should be focused on FIG. 3. A plurality of first communication passages 75, which lead to the first hydraulic chamber 46 of the first hydraulic clutch 28, are radially formed so as to penetrate the first boss 32, the transmission cylinder shaft 18, and the second main shaft 16. An annular first hydraulic passage 76, which allows these first communication passages 75 to communicate with the first operating-fluid supply chamber 68, is formed between the inner supply pipe 71 and the outer supply pipe 73. In addition, a plurality of second communication passages 77, which lead to the second hydraulic chamber 56 of the second hydraulic clutch 29, are radially formed so as to penetrate the second boss 59. A second hydraulic passage 78, which allows these second communication passages 77 to communicate with the second operating-fluid supply chamber 69, is formed in the inner supply pipe 71 and together with an inner end portion of the center hole 70.

In this way, inside the second main shaft 16, the first and the second hydraulic passages 76 and 78 are concentrically formed, and enable hydraulic pressure to be individually applied to the first and the second clutch pistons 44 and 54 respectively of the first and the second hydraulic clutches 28 and 29 in the clutch system 8. In this case, the operating fluid is supplied from the second-end side of the second main shaft 16.

A hydraulic pressure control means 100, which controls the supply of the operating fluid to the first and the second hydraulic passage 76 and 78, is attached to the opposite side surface of the engine E from the clutch system 8, that is, to the outer surface of the engine cover 63.

Now, refer also to FIG. 5. The hydraulic pressure control means 100 includes a first solenoid valve 101, which controls the supply of operating fluid to the first hydraulic passage 76, that is, to the first operating-fluid supply chamber 68. The hydraulic pressure control means 100 also includes a second solenoid valve 102, which controls the supply of operating fluid to the second hydraulic passage 78, that is, to the second operating-fluid supply chamber 69. The first and the second solenoid valves 101 and 102 share a common valve body 103, which is fastened to a support plate 105 by a plurality of bolts 104. To put it another way, a common support plate 105 supports both the first and the second solenoid valves 101 and 102, while the support plate 105 is joined to the outer surface of the engine cover 63 by a plurality of bolts 106, 106 in a position above the cap 66.

A first communicating-fluid passage 107 links the first solenoid valve 101 of the hydraulic pressure control means 100 with the first operating-fluid supply chamber 68, while a second communicating-fluid passage 108 links the second solenoid valve 102 with the second operating-fluid supply chamber 69. At least one of the first and the second communicating-fluid passages 107 and 108—in this embodiment the first communicating-fluid passage 107—has a part formed between the joint surfaces of the engine cover 63 and the support plate 105. For this purpose, a groove 109 is formed in the outer surface of the engine cover 63 to form a part of the first communicating-fluid passage 107 the engine cover 63 and of the support plate. A connecting-pipe passage 110, which forms a part of the second communicating-fluid passage 108, has a first end joined to the support plate 105 and connected to the second solenoid valve 102. Meanwhile, a second end of the connecting-pipe passage 110 is joined to the engine cover 63 in a position near the second operating-fluid supply chamber 69.

An oil filter 112 is attached to the engine cover 63 below the hydraulic pressure control means 100. A shift-control motor 113 is attached to the engine cover 63 near and below the cap 66, and generates the power to switch the state of establishments of the first to the fifth gear trains G1 to G5 in the gear transmission 7. The power transmitted through the gear transmission 7 drives to rotate an output shaft 111, which is supported by and sticks out of the engine cover 63 in a position next to the hydraulic pressure control means 100.

Now, attention should be focused on FIG. 4. In the gear transmission 7, each of the second and the fourth gear trains G2 and G4 is established by a gear on the first main shaft 15 and one on the counter shaft 17 while each of the first, the third, and the fifth gear trains G1, G3, and G5 is established by a gear on the second main shaft 16 and the counter shaft 17. A damper spring 81 and a secondary reduction system 82 transmit, to the output shaft 111, the power outputted from the second end portion of the countershaft 17, which end portion sticks out of the left-hand sidewall 14b of the crankcase 14.

The second-speed gear train G2 includes a second-speed drive gear 83, which is integrally provided on the first main shaft 15, and a second-speed driven idle gear 84, which is supported on the countershaft 17 so as to rotate relatively to the countershaft 17, and which meshes with the second-speed drive gear 83. The fourth-speed gear train G4 includes a fourth-speed drive gear 85, which is fixed on the first main shaft 15, and a fourth-speed driven idle gear 86, which is supported on the countershaft 17 so as to rotate relatively to the countershaft 17, and which meshes with the fourth-speed drive gear 85.

A first shifter 87 is splined to fit onto the countershaft 17 between the second- and the fourth-speed driven idle gears 84 and 86. The state that can be selected for the first shifter 87 is one of the following: the first shifter 87 engages with any one of the second- and the fourth-speed driven idle gears 84 and 86, and the first shifter 87 engages neither one of the second- and the fourth-speed driven idle gears 84 and 86. The movement of the first shifter 87 in the axial direction enables the switching between a neutral state and a state where any one of the second and the fourth gear trains are established. In the neutral state, both of the second- and the fourth-speed driven idle gears freely rotate relatively to the countershaft 17. In the state in which any one of the second- and the fourth-speed gear trains are established, the relevant one of the second- and the fourth-speed driven idle gears 84 and 86 is joined to the countershaft 17 so as not to rotate relatively to the countershaft 17.

The first-speed gear train G1 includes a first-speed drive gear 88, which is integrally provided on the second main shaft 16, and a first-speed driven idle gear 89, which is supported on the countershaft 17 so as to freely rotate relatively to the countershaft 17, and which meshes with the first-speed drive gear 88. The third-speed gear train G3 includes a third-speed drive gear 90, which is splined to fit onto the second main shaft 16. The third-speed drive gear 90 is allowed to slide in the axial direction of the second main shaft 16, but is not allowed to rotate relatively to the second main shaft 16. The third-speed gear train G3 also includes a third-speed driven idle gear 91, which is supported on, so as to freely rotate relatively to, the countershaft 17 and which meshes with the third-speed drive gear 90. The fifth-speed gear train G5 includes a fifth-speed drive idle gear 92, which is supported on, so as to freely rotate relatively to, the second main shaft 16. The fifth-speed gear train G5 also includes a fifth-speed driven gear 93, which is supported on, so as not to rotate relatively to, countershaft 17, and which meshes with the fifth-speed drive idle gear 92.

The third-speed drive gear 90 is integrally formed with a second shifter 94. The second shifter 94 is splined to fit onto the second main shaft 16 while the second shifter 94 enables the switching between a state where the second shifter 94 engages with the fifth-speed drive idle gear 92 and a state the two are disengaged. The fifth-speed driven gear 93 is integrally formed with a third shifter 95. The third shifter 95 is splined to fit onto the countershaft 17 while the third shifter 95 enables the switching between a state where the third shifter 95 engages with any one of the first- and the third-speed driven idle gears 89 and 91 supported on, as allowed to rotate relatively to, the countershaft 17, and a state where the third shifter engages with none of the first- and the third-speed driven idle gears 89 and 91.

Moving the second and the third shifters 94 and 95 in the axial direction enables the switching among the following states: a neutral state, where the fifth-speed drive idle gear 92 freely rotates relatively to the second main shaft 16 while the first- and the third-speed driven idle gears 89 and 91 freely rotate relatively to the countershaft 17; a state where the first-speed driven idle gear 89 is joined to, so as not to rotate relatively to, the countershaft 17, so that the first-speed gear train G1 is established; a state where the third-speed drive gear 90 is joined to, so as not to rotate relatively to, the second main shaft 16 while the third-speed driven idle gear 91 is joined to, so as not to rotate relatively to, the countershaft 17, so that the third-speed gear train G3 is established; and a state where the fifth-speed drive idle gear 92 is joined to, as not allowed to rotate relative to, the second main shaft 16, so that the fifth-speed gear train G5 is established.

The first, the second, and the third shifters 87, 94, and 95 are rotatably held respectively by a first, a second, and a third shift forks 96, 97, and 98. When the shift-control motor 113 is activated to move rotationally a shift drum (not illustrated), the first to the third shift forks 96 to 98 as well as the shifters 87, 94, and 95 are slidingly operated in the axial direction to selectively establish the first- to the fifth-speed gear trains G1 to G5.

Incidentally, engagement and disengagement of the first and the second hydraulic clutch 28 and 29 of the clutch system 8 are switched alternatively. When the gear-speed is changed from one to another with the power from the engine E being transmitted to any one of the first and the second main shafts 15 and 16 of the gear transmission 7, for the purpose of a preliminary gear shift, one of the gear trains between the countershaft 17 and the other one of the first and the second main shafts 15 and 16 is established. For example, suppose that a vehicle runs in second speed, that is, the second-speed gear train G2 is established in a state where the power from engine E is transmitted to the first main shaft 15 with the first hydraulic clutch 28 being engaged. In this case, before down-shifting to first speed is carried out, the third shifter 93 is slidingly operated towards the side where the third shifter 93 can engage with the first-speed driven idle gear 89. Thus established is the first-speed gear train G1 between the countershaft 17 and the second main shaft 16 linked to the second hydraulic clutch 29, in which the power transmission has been cut off thus far. Meanwhile, before up-shifting to the third gear, the third shifter 93 is slidingly moved towards the side where the third shifter can engage with the third-speed driven idle gear 91. Thus established is a third-speed gear train G3 between the countershaft 17 and the second main shaft 16.

Each of these idle gears constitutes a part of one of the gear trains to be established for the preliminary transmission at the time of changing the speed gear, and is rotatably supported on the second main shaft 16 or on the counter shaft 17. Each of the shifters is supported on any one of the second main shaft 16 and the countershaft 17, while the shifters are allowed to slide on the corresponding shafts, but the shifters are not allowed to rotate relatively to the corresponding shafts. A large difference of revolutions between one of the idle gears and the corresponding one of the shifters produces a large noise when the idle gear and the shifter engage with each other. In response to this problem, a single synchronizing means 116 is provided to give acceleration torque or deceleration torque to one of the first and the second main shafts 15 and 16, precisely, to the one to which the power transmission from the engine E has been cut off.

The synchronizing means 116 includes an interlocking rotation shaft 117, a first gear-transmission mechanism 118, a second gear-transmission mechanism 119, and a switching mechanism 120. The interlocking rotation shaft 117 rotates in conjunction with one of the first and the second main shafts 15 and 16—in this embodiment, with the second main shaft 16. The first and the second gear-transmission mechanisms 118 and 119 are linked to the other one of the first and the second main shafts 15 and 16—in this embodiment, the first main shaft 15. While the first gear-transmission mechanism 118 increases the speed of the torque transmitted from the first main shaft 15, the second gear-transmission mechanism 119 decreases the speed of the torque. The switching mechanism 120 switches among the alternative linking of the interlocking rotational shaft 117 with either one of the first and the second gear-transmission mechanisms 118 and 119, and the de-linking therewith.

In each configuration of FIGS. 2 to 6, the interlocking rotation shaft 117 appears above the first and the second main shafts 15 and 16 for the convenience of the drawing, but is actually placed below the two main shafts 15 and 16. In addition, the interlocking rotation shaft 117 has an axis parallel to the first and the second main shafts 15 and 16. A first end of the interlocking rotation shaft 117 is rotatably supported by a support member 125 with a ball bearing 121 interposed in between while a second end of the interlocking rotation shaft 117 is rotatably supported by the left-hand sidewall 14b of the crankcase 14 with a ball bearing 122 interposed in between. Here, the support member 125 is fastened to the support ring 26, which is fastened to the right-hand sidewall 14a, and which supports the transmission cylinder shaft 18.

The first and the second gear-transmission mechanisms 118 and 119 are connected to the first main shaft 15, and are placed between the first- to the fifth-speed gear trains G1 to G5 and the clutch system 8, which includes the first and the second hydraulic clutches 28 and 29. The first gear-transmission mechanism 118 includes a first large-diameter gear 123 and a first small-diameter gear 124, which meshes with the first large-diameter gear 123. The first large-diameter gear 123 is integrally provided in a position near an end of the transmission cylinder shaft 18, which end is the opposite one from the location of the clutch system 8. The transmission cylinder shaft 18 is connected to, so as not to rotate relatively to, the first main shaft 15. Onto the opposite end portion of the transmission cylinder shaft 18 from the clutch system 8, a second small-diameter gear 125 is integrally provided. The second small-diameter gear 125 and a second large-diameter gear 126, which meshes with the second small-diameter gear 125, constitute the second gear-transmission mechanism 119.

Note that the first and the second large-diameter gears 123 and 126 have the same diameter while the first and the second small-diameter gears 124 and 125 have the same diameter. The first and the second large-diameter gears 123 and 126 have a larger diameter than the first and the second small-diameter gears 124 and 125 have.

At the first end side of the interlocking rotation shaft 117, a large-diameter portion 117a is formed coaxially and integrally therewith. The large-diameter portion 117a supports the first small-diameter gear 124 and the second large-diameter gear 126, and does not allow the rotation of these gears 124 and 126 relative to the large-diameter portion 117a. The switching mechanism 120 switches among a first state where the first small-diameter gear 124 is joined to, so as not to rotate relatively to, the large-diameter portion 117a, a second state where the large-diameter gear 126 is joined to, so as not to rotate relatively to, the large-diameter portion 117a, and a third state where neither the first small-diameter gear 124 nor the second large-diameter gear 126 is joined to the large-diameter portion 117a.

A conventionally known synchromesh mechanism is employed for the switching mechanism 120, and no detail description will be given here. The switching among the first to the third states is carried out by sliding a sleeve 127 in the axial direction of the large-diameter portion 117a.

The interlocking rotation shaft 117 is interlocked and joined with the second end portion of the second main shaft 16 in a position in the gear transmission 8 so that the first to the fifth gear trains G1 to G5 are set with the joining position at one side, and the first and the second gear-transmission mechanism 118 and 119 at the other side. In other words, a gear 128 provided on the second end portion of the interlocking rotation shaft 117 meshes with a gear 129 fixed on the second main shaft 16 between the left-hand sidewall 14b of the crankcase 14 and the first-speed drive gear 88. The two gears are formed to have the same diameter.

Now, refer also to FIG. 6. An actuator 130, which drives the sleeve 127 of the switching mechanism 120, is placed at a side of the clutch system 8, which has the first and the second hydraulic clutches 128 and 129. The actuator has a hydraulic cylinder 131 and a pair of electromagnetic switching valves 132 and 133, which control the operation of the hydraulic cylinder 131.

A cylinder body 134 and a piston 135 slidably fitted thereinto constitute the hydraulic cylinder 131, which is placed below the switching mechanism 120 and between the switching mechanism 120 and the clutch system 8. Inside the cylinder body 134, a first and a second control hydraulic chambers 137 and 138 are formed to face the two ends of the piston 135 respectively. Springs 139 and 140 are accommodated in the first and the second control hydraulic chambers 137 and 138 respectively to bias the piston 135 towards the neutral position.

An increased hydraulic pressure of the first control hydraulic chamber 137 and a decreased hydraulic pressure of the second control hydraulic chamber 138 move the piston 135 to a side, and result in a decrease in the volume of the second control hydraulic chamber 138. Thus, a piston rod 141 and a fork 142 operate so as to move the sleeve 127 to a side, where the sleeve 127 connects the first gear-transmission mechanism 118 with the interlocking rotation shaft 117 while not allowing their relative rotation to each other. In contrast, an increased hydraulic pressure of the second control hydraulic chamber 138 and a decreased hydraulic pressure of the first control hydraulic chamber 137 move the piston 135 to another side, and result in a decrease in the volume of the first control hydraulic chamber 137. Thus, the piston rod 141 and the fork 142 operate so as to move the sleeve 127 to another side, where the sleeve 127 links the second gear-transmission mechanism 119 with the interlocking rotation shaft 117 while not allowing their relative rotation to each other.

The first and the second electromagnetic switching valves 132 and 133 are placed below the clutch system 8, and are attached to an oil pan 145. It should be noted that the oil pan 145 appears above the crankcase 14 for the convenience of the drawing, but is actually joined to the bottom of the crankcase 14 as FIG. 6 shows.

A fluid passage 148 is provided in the oil pan 145 so as to be connected, via a connection pipe 147, to an operating-fluid supply passage 146 provided in the crankcase 14. A supply passage 149, which is formed between the oil pan 145 and a lid plate 151 fastened thereto, leads to the first control hydraulic chamber 137. A relief passage 150 is provided in the oil pan 145, and has an opening inside the crankcase 14. The first electromagnetic switching valve 132 controls—increases and decreases—the hydraulic pressure of the first control hydraulic chamber 137 so as to alternatively switch between a state where the fluid passage 148 communicates to the supply passage 149 and another state where the relief passage 150 communicates to the supply passage 149.

The second electromagnetic valve 133 controls—increases and decreases—the hydraulic pressure of the second control hydraulic chamber 138 so as to alternatively switch a state where the fluid passage 148 in the oil pan 145 communicates to the second control hydraulic chamber 138 and another state where the hydraulic pressure of the second control hydraulic chamber 138 is relieved to the inside of the crankcase 14.

Next, what follows is a description of the operation of this embodiment. The first- to the fifth-speed gear trains G1 to G5, each of which can be selectively established, are provided between the countershaft 17, and the first and the second main shafts 15 and 16. Alternative switching is possible so that the power from the engine E can be transmitted either one of the first and second main shafts 15 and 16. Assuming that the power from the engine E is transmitted any one of the first and the second main shaft 15 and 16, and that a gear shifting is carried out. At this time, as a preliminary gear shifting, one of the gear trains is established between the countershaft 17 and the other one of the main shafts 15 and 16, that is, the one that the power from the engine E is not transmitted to. Meanwhile, the single synchronizing means 116, which serves commonly to the gear trains G1 to G5, gives decelerating or accelerating torque to this one of the main shafts 15 and 16, the one that the power from the engine E is not transmitted to.

The above-described operation produces a smaller difference in revolution rate between the members that engage with each other when one of the gear trains is established. This, in turn, results in a smaller noise produced at the time of engagement. Assuming that the vehicle runs at a constant speed in second gear, when the power from the engine E is transmitted to the first main shaft 15 with the first hydraulic clutch 28 connected. The first-speed gear train G1 has to be established between the second main shaft 16 and the countershaft 17 before the down-shifting to the first gear is carried out. To this end, the third shifter 93 operates and slides to a side so as to engage with the first-speed driven idle gear 89. In this case, the synchronizing means 116 gives, to the second main shaft 16, to which the power from the engine E is not transmitted, torque that comes from the first main shaft 15 but in a revolution rate increased by the first gear-transmission mechanism 118.

While the vehicle runs at a second speed, the second main shaft 16, dragged by the second hydraulic clutch 29 with no power from engine E transmitted thereto, revolves at a revolution rate NB, which is approximately equal to a revolution rate NA of the first main shaft 15, as FIG. 7 shows. In this case, the establishment of the first-speed gear train G1 at a time t3, makes the revolution rate NB of the second main shaft 16 drastically increase from the revolution rate NA of the first main shaft 15 as the dot-dash line in FIG. 7 shows unless the synchronizing means 116 gives torque to the second main shaft 16. This drastic increase derives from the difference in the speed reducing ratio between the second- and the first-speed gear trains G2 and G1. While the third shifter 93 revolves together with the countershaft 17, the first-speed driven idle gear 89 is made to revolve about the axis of the countershaft 17 by the power transmitted from the second main shaft 16. The first-speed driven idle gear 89 revolves at a lower rate than the third shifter 93 does before the engagement of these two, and the difference in the revolution rate produces a big engagement noise.

Assuming that the actuator 130 of the synchronizing means 116 starts to operate at the time t1 prior to the time t3, and that the linking operation of the first gear-transmission mechanism 118 with the interlocking rotation shaft 117 is completed at the time t2 prior to the time t3. Then, as one of the arrows in FIG. 8 shows, the torque with a speed increased by the first gear-transmission mechanism 118 of the synchronizing means 116 is transmitted to the second main shaft 16, and thus the revolution rate of the second main shaft 16 begins to increase. As a result, the revolution rate of the second main shaft 16 increases, by the time t2, up to a rate close to the rate at which the second main shaft 16 eventually revolves when the first gear train G1 is established at the time t3.

As described above, in comparison with the amount of change a in the revolution rate of the second main shaft 16 at the time t3 in a case where no torque with its speed increased is given thereto by the synchronizing means 116, the amount of change b in the revolution rate of the second main shaft 16 at the time t3 in a case where torque with its speed increased is given thereto by the synchronizing means 116 is significantly small. Accordingly, when, in a vehicle running at a constant speed in second gear, a preliminary gear shifting is carried out to establish the first-speed gear train G1 in preparation for the down-shifting, the difference in rotation rate between the third shifter 93 and the first-speed driven idle gear 89 is made small, and thus the noise, generated when the third shifter 93 and the first-speed driven idle gear 89 are engaged, is also made small.

Now, assuming that the vehicle runs at a constant speed in second gear, when the power from the engine E is transmitted to the first main shaft 15 with the first hydraulic clutch 28 connected. The third-speed gear train G3 has to be established between the second main shaft 16 and the countershaft 17 before the up-shifting to the third gear is carried out. To this end, the third shifter 93 operates and slides to a side so as to engage with the third-speed driven idle gear 91. In this case, the establishment of the third-speed gear train G3 at a time t3 makes the revolution rate NB of the second main shaft 16 drastically decrease from the revolution rate NA of the first main shaft 15 as the dot-dash line in FIG. 9 shows unless the synchronizing means 116 gives torque to the second main shaft 16. This drastic decrease derives from the difference in the speed reducing ratio between the second- and the first-speed gear trains G2 and G3. While the third shifter 93 revolves together with the countershaft 17, the third-speed driven idle gear 91 is made to revolve about the axis of the countershaft 17 by the power transmitted from the second main shaft 16. The third-speed driven idle gear 91 revolves at a higher rate than the third shifter 93 does before the engagement of these two, and the difference in the revolution rate produces a big engagement noise.

Assuming that the actuator 130 of the synchronizing means 116 starts to operate at the time t1 prior to the time t3, and that the linking operation of the second gear-transmission mechanism 119 with the interlocking rotation shaft 117 is completed at the time t2 prior to the time t3. Then, as one of the arrows in FIG. 8 shows, the torque with a speed decreased by the second gear-transmission mechanism 119 of the synchronizing means 116 is transmitted to the second main shaft 16, and thus the revolution rate of the second main shaft 16 begins to decrease. As a result, the revolution rate of the second main shaft 16 decreases, by the time t2, down to a rate close to the rate at which the second main shaft 16 eventually revolves when the third gear train G3 is established at the time t3.

As described above, in comparison with the amount of change c in the revolution rate of the second main shaft 16 at the time t3 in a case where no torque with its speed decreased is given thereto by the synchronizing means 116, the amount of change d in the revolution rate of the second main shaft 16 at the time t3 in a case where torque with its speed decreased is given thereto by the synchronizing means 116 is significantly small. Accordingly, when, in a vehicle running at a constant speed in second gear, a preliminary gear shifting is carried out to establish the third-speed gear train G3 in preparation for the up-shifting, the difference in rotation rate between the third shifter 93 and the third-speed driven idle gear 91 is made small, and thus the noise, generated when the third shifter 93 and the third-speed driven idle gear 91 are engaged, is also made small.

In addition, the synchronizing means 116 is a single unit commonly serves for all the gear trains G1 to G5, which results in a smaller number of component parts than otherwise, and which requires a smaller space than otherwise.

The synchronizing means 116 includes the interlocking rotation shaft 117, which operates in conjunction with the second main shaft 16. The synchronizing means 116 also includes the first gear-transmission mechanism 118, which is linked with the first main shaft 15, and which increases the speed of the torque transmitted from the first main shaft 15. The synchronizing means 116 also includes the second gear-transmission mechanism 119, which reduces the speed of the above-mentioned torque. The synchronizing means 116 further includes the switching mechanism for linkage 120 so as to alternatively switch between the states where the interlocking rotation shaft 117 is linked to the first and the second gear-transmission mechanisms 118 and 119 respectively. Providing the synchronizing means 116 between the two main shafts 16 and 17 makes the synchronizing means 116 smaller, and this, in turn, makes the transmission system M smaller.

The arrangement of the first and the second main shafts 15 and 16, with the second main shaft 16 coaxially penetrating the first main shaft 15, allows the two shafts 15 and 16 to relatively rotate to each other. Between the engine E and the first end portions of the two main shafts 15 and 16, the first and the second hydraulic clutches 28 and 29 are provided respectively, and the engagement and disengagement of the two clutches 28 and 29 are alternatively switched. The first and the second gear-transmission mechanisms 118 and 119, which are placed between these hydraulic clutches 28 and 29 and the first to the fifth gear trains G1 to G5, are linked with the first main shaft 15. The interlocking rotation shaft 117, which has an axis parallel to the first and the second main shafts 15 and 16, is linked with, and operates in conjunction with, the second end portion of the second main shaft 16 in a position where the interlocking rotation shaft 117, and the first and the second gear-transmission mechanisms 118 and 119 are placed at respective sides of the first to the fifth gear trains G1 to G5. Consequently, the synchronizing means 116 is not placed among the first to the fifth gear trains G1 to G5. This allows a compact arrangement of the first to the fifth gear trains G1 to G5 in the axial direction of the two main shafts 15 and 16 and of the countershaft 17, so that the two main shafts 15 and 16 as well as the countershaft 17 are made shorter in the axial direction thereof.

In addition, the actuator 130, which drives the synchronizing means 116, is placed at a side of the clutch system 8, which includes the first and the second hydraulic clutches 28 and 29. The placement of the actuator 130 in an unused space at a side of two hydraulic clutches 28 and 29 allows the actuator 130 to be placed closely to the first and the second gear-transmission mechanism 118 and 119 of the synchronizing means 116, which gear-transmission mechanisms 118 and 119 are placed between the first to the fifth gear trains G1 to G5 and the two hydraulic clutches 28 and 29. The above arrangement makes the transmission M compact as a whole.

The gear transmission 7 includes the first main shaft 15, which has a first end portion linked with the first hydraulic clutch 28, and which is placed in parallel to the crankshaft 9. Also included is the second main shaft 16, which has a first end portion linked with the second hydraulic clutch 29, and which coaxially penetrates the first main shaft 15. The first and the second hydraulic passages 76 and 78 are concentrically formed inside the second main shaft 16, and help apply hydraulic pressure respectively to the first and the second clutch pistons 44 and 54 of the first and the second hydraulic clutches 28 and 29. To this end, the operating fluid is supplied from the second end side of the second main shaft 16.

As a result, a large sideward protrusion of the power unit P can be avoided even on the side where the clutch system 8 is located. This, in turn, allows a larger bank angle to be set when the power unit P is mounted on a motorcycle.

The hydraulic control means 100, which controls the supply of the operating fluid to the first and the second hydraulic passages 76 and 78, is placed on the engine cover 63, which forms the opposite side-surface of the engine E from the clutch system 8. Consequently, the crankcase 14 is prevented from having a larger vertical dimension around the transmission housing 13, which is formed inside the crankcase 14 to accommodate the gear transmission 7 therein. Thus, a small crankcase 14 is accomplished.

The hydraulic control means 100 is supported on the support plate 105 attached to the engine cover 63. A part of at least one of the first and the second communicating-fluid passages 107 and 108, which respectively link the hydraulic control means 100 with the first and the second hydraulic passages 76 and 78, is formed between the attaching surfaces respectively of the engine cover 63 and of the support plate 105—in this embodiment, a part of the first communicating-fluid passage 107 is formed in this way. As a result, the part of the communicating-fluid passage 107 is formed with ease.

The input member 34 is provided to the clutch system 8. The input member 34 includes the annular plate portion 34a, which receives the power from the engine E, the inner cylindrical portion 34b, which has the base end formed integrally with and continuously from the inner perimeter side of the annular plate portion 34a, and the outer cylindrical portion 34c, which coaxially surrounds the inner cylindrical portion 34b, and which has the base end formed integrally with and continuously from the outer perimeter side of the annular plate 34a. The inner cylindrical portion 34b is made to be the input side of the first hydraulic clutch 28, and the outer cylindrical portion 34c is made to be the input side of the second hydraulic clutch 29. The first and the second hydraulic clutches 28 and 29 are arranged so that the first hydraulic clutch 28 is concentrically surrounded by the second hydraulic clutch 29. The first and the second clutch pistons 44 and 54, which are provided commonly to and included respectively in the first and the second hydraulic clutches 28 and 29, are placed on the opening end side of the input member 34.

The above-described structure of the clutch system 8 reduces the number of component parts of the clutch system 8, and makes the clutch system 8 small as a whole. In addition, when the engagement and the disengagement of the two hydraulic clutches 28 and 29 are switched, the output members 40 and 50 of the respective hydraulic clutches 28 and 29 engage with a common input member 34. This results in a smaller change in inertial force at the time of switching the engagement and disengagement, and in a smooth switching between engagement and disengagement.

Moreover, the first output member 40 of the first hydraulic clutch 28 has the first cylindrical portion 40a coaxially surrounding the inner cylindrical portion 34b, and is linked with the first main shaft 15 so as not to rotate relatively thereto. Meanwhile, the second output member 50 of the second hydraulic clutch 29 has the second cylindrical portion 50a coaxially surrounding the first cylindrical portion 40a inside the outer cylindrical portion 34c, and is linked with the second main shaft 16 so as not to rotate relatively thereto. Consequently, the first and the second cylindrical portions 40a and 50a, which are respectively parts of the output members 40 and 50 of the two clutches 28 and 29, are placed closely to each other. Thus, the inertial mass on the output side of the first clutch 28 and that of the second clutch 29 get closer to each other. As a result, no big change in feelings occurs when the clutches engage and disengage.

The first and the second clutch pistons 44 and 54, which are included respectively in the first and the second hydraulic clutches 28 and 29, are arranged side by side in the axial direction while the second clutch piston 54 has a larger diameter than the first clutch piston 44 has. Inside the second main shaft 16, the first and the second hydraulic passage 76 and 78 are formed to supply the operating fluid to the first and the second clutch pistons 44 and 54. Consequently, no mechanism for switching the engagement and disengagement of the two hydraulic clutches 28 and 29 is placed outside of the clutch system 8 so that no space for placing such a mechanism needs to be secured outside of the clutch system 8.

The damper spring 12 is set between the annular plate portion 34a of the input member 34 and the driven gear 31 linked to the engine E. Consequently, the fluctuation of the power transmitted from the engine E to the two hydraulic clutches 28 and 29 is absorbed by the common damper spring 12.

The present invention is not limited to the embodiment that has been described thus far. Various changes can be made on the design without departing from the invention defined by the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch system, comprising:
   a first hydraulic clutch, said first hydraulic clutch being provided between a power source and a first driven shaft, being capable of connecting and disconnecting between the power source and the first driven shaft, and including a first clutch piston;
   a second hydraulic clutch, said second hydraulic clutch being provided between the power source and a second driven shaft, being capable of connecting and disconnecting between the power source and the second driven shaft, and including a second clutch piston; and
   an input member, said input member including:
      an annular plate portion that receives power from the power source;
      an inner cylindrical portion having a base end formed integrally with and continuously from an inner perimeter side of the annular plate portion; and
      an outer cylindrical portion coaxially surrounding the inner cylindrical portion and having a base end formed integrally with and continuous from the outer perimeter side of the annular plate portion,
   wherein the input member is provided commonly to the first and the second hydraulic clutches that are arranged with the second hydraulic clutch concentrically surrounding the first hydraulic clutch, the inner and the outer cylindrical portions are made to be the input sides respectively of the first and the second hydraulic clutches, and the first and the second clutch pistons are placed on an opening end side of the input member.

2. The clutch system according to claim 1, wherein the first hydraulic clutch includes a first output member having a first cylindrical portion coaxially surrounding the inner cylindrical portion and being linked with the first driven shaft so as not to be allowed to rotate relatively thereto, and the second hydraulic clutch includes a second output member having a second cylindrical portion coaxially surrounding the first cylindrical portion inside the outer cylindrical portion and being linked with the second driven shaft so as not to be allowed to rotate relatively thereto.

3. The clutch system according to claim 2, further comprising a buffering member set between the annular plate portion of the input member and a rotating transmission member connecting to the power source.

4. The clutch system according to claim 1, wherein the first and the second driven shafts are coaxially arranged so that the second driven shaft penetrates the first driven shafts, the first and the second clutch pistons are arranged side by side in the axial direction and the second clutch piston has a larger diameter than the first clutch piston has, and hydraulic passages are formed inside the second driven shaft to supply operating fluid to a side of the first and the second clutch pistons.

5. The clutch system according to claim 2, wherein the first and the second driven shafts are coaxially arranged so that the second driven shaft penetrates the first driven shafts, the first and the second clutch pistons are arranged side by side in the axial direction and the second clutch piston has a larger diameter than the first clutch piston has, and hydraulic passages are formed inside the second driven shaft to supply operating fluid to a side of the first and the second clutch pistons.

6. The clutch system according to claim 5, further comprising operating-fluid supply chambers for supplying the operating fluid, said operating-fluid supply chambers being connected to the hydraulic passages in an opposite end portion of the second driven shaft from the first and the second clutches.

7. The clutch system according to claim 5, further comprising a buffering member set between the annular plate portion of the input member and a rotating transmission member connecting to the power source.

8. The clutch system according to claim 4, further comprising operating-fluid supply chambers for supplying the operating fluid, said operating-fluid supply chambers being connected to the hydraulic passages in an opposite end portion of the second driven shaft from the first and the second clutches.

9. The clutch system according to claim 4, further comprising a buffering member set between the annular plate portion of the input member and a rotating transmission member connecting to the power source.

10. The clutch system according to claim 1, further comprising a buffering member set between the annular plate portion of the input member and a rotating transmission member connecting to the power source.

11. A clutch system, comprising:
a first hydraulic clutch connecting and disconnecting between a power source and a first driven shaft;
a second hydraulic clutch connecting and disconnecting between the power source and a second driven shaft; and
an input member, said input member including:
an annular plate portion that receives power from the power source;
an inner cylindrical portion formed integrally with the annular plate portion; and
an outer cylindrical portion coaxially surrounding the inner cylindrical portion and formed integrally with the annular plate portion,
wherein the input member is provided commonly to the first and the second hydraulic clutches, and the inner and the outer cylindrical portions are made to be the input sides respectively of the first and the second hydraulic clutches, and
wherein the second hydraulic clutch surrounds the first hydraulic clutch, and the second driven shaft penetrates the first driven shaft.

12. The clutch system according to claim 11, wherein the first hydraulic clutch includes a first output member having a first cylindrical portion coaxially surrounding the inner cylindrical portion and being linked with the first driven shaft so as not to be allowed to rotate relatively thereto, and the second hydraulic clutch includes a second output member having a second cylindrical portion coaxially surrounding the first cylindrical portion inside the outer cylindrical portion and being linked with the second driven shaft so as not to be allowed to rotate relatively thereto.

13. The clutch system according to claim 12, wherein the first and the second driven shafts are coaxially arranged so that the second driven shaft penetrates the first driven shaft, first and the second clutch pistons of the first and second hydraulic clutches, respectively, are arranged side by side in the axial direction and the second clutch piston has a larger diameter than the first clutch piston has, and hydraulic passages are formed inside the second driven shaft to supply operating fluid to a side of the first and the second clutch pistons.

14. The clutch system according to claim 13, further comprising operating-fluid supply chambers for supplying the operating fluid, said operating-fluid supply chambers being connected to the hydraulic passages in an opposite end portion of the second driven shaft from the first and the second clutches.

15. The clutch system according to claim 13, further comprising a buffering member set between the annular plate portion of the input member and a rotating transmission member connecting to the power source.

16. The clutch system according to claim 12, further comprising a buffering member set between the annular plate portion of the input member and a rotating transmission member connecting to the power source.

17. The clutch system according to claim 11, further comprising a buffering member set between the annular plate portion of the input member and a rotating transmission member connecting to the power source.

18. A clutch system, comprising:
a first hydraulic clutch connecting and disconnecting between a power source and a first driven shaft;
a second hydraulic clutch connecting and disconnecting between the power source and a second driven shaft; and
an input member, said input member including:
an annular plate portion that receives power from the power source;
an inner cylindrical portion formed integrally with the annular plate portion; and
an outer cylindrical portion coaxially surrounding the inner cylindrical portion and formed integrally with the annular plate portion,
wherein the input member is provided commonly to the first and the second hydraulic clutches, and the inner and the outer cylindrical portions are made to be the input sides respectively of the first and the second hydraulic clutches, and
wherein the first and the second driven shafts are coaxially arranged so that the second driven shaft penetrates the first driven shaft, first and the second clutch pistons of the first and second hydraulic clutches, respectively, are arranged side by side in the axial direction and the second clutch piston has a larger diameter than the first clutch piston has, and hydraulic passages are formed inside the second driven shaft to supply operating fluid to a side of the first and the second clutch pistons.

19. The clutch system according to claim 18, further comprising operating-fluid supply chambers for supplying the operating fluid, said operating-fluid supply chambers being connected to the hydraulic passages in an opposite end portion of the second driven shaft from the first and the second clutches.

20. The clutch system according to claim 18, further comprising a buffering member set between the annular plate portion of the input member and a rotating transmission member connecting to the power source.

* * * * *